United States Patent [19]

Smith

[11] Patent Number: 5,710,807
[45] Date of Patent: Jan. 20, 1998

[54] METHOD FOR RECORDING NON-COMMUNICATION INTERVALS DURING A COMMUNICATIONS CALL

[75] Inventor: David B. Smith, Hinsdale, Ill.

[73] Assignee: Lucent Technologies Inc., Murray Hill, N.J.

[21] Appl. No.: 664,895

[22] Filed: Jun. 17, 1996

Related U.S. Application Data

[63] Continuation of Ser. No. 342,199, Nov. 18, 1994, abandoned.

[51] Int. Cl.⁶ .................................................. H04M 15/00
[52] U.S. Cl. ........................... 379/114; 379/121; 379/134
[58] Field of Search ........................ 379/111–121, 133, 379/122, 134, 135, 136, 137–139, 201, 210, 211, 212, 214, 215

[56] References Cited

U.S. PATENT DOCUMENTS

| | | | |
|---|---|---|---|
| 4,694,483 | 9/1987 | Cheung | 379/112 X |
| 4,850,007 | 7/1989 | Marino et al. | 379/112 X |
| 5,136,690 | 8/1992 | Becker et al. | 379/122 X |
| 5,425,087 | 6/1995 | Gerber et al. | 379/134 |
| 5,448,625 | 9/1995 | Lederman | 372/114 X |

OTHER PUBLICATIONS

Technical Document AT&T 235–190–300, Section 2 Automatic Message Accounting Overview, 5ESS(R) Switch and 5ESS(R)–2000 Switch Billing Features and Specifications, Issue 7.00, Nov. 1994, pp. 2-1-2-98.

Technical Document AT&T 235–190–300, Section 6 Analog and Miscellaneous Features, 5ESS(R) Switch and 5ESS(R)–2000 Switch Billing Features and Specifications, Issue 7.00, Nov. 1994, pp. 6-1-6-63.

*Primary Examiner*—Curtis Kuntz
*Assistant Examiner*—Paul Loomis
*Attorney, Agent, or Firm*—Werner Ulrich; Mony R. Ghose

[57] ABSTRACT

In a telecommunications call a different charge is incurred for intervals of noncommunication than for intervals during which communication may take place. For example, a period of hold is one during which the party on hold cannot communicate with the other end of a connection. Such intervals are accumulated for a call and the charge for the call is adjusted in accordance with the total length of the noncommunicating intervals. Advantageously customers are charged primarily for the period of time during which they can actually communicate, without having to disconnect and later reestablish a call.

20 Claims, 4 Drawing Sheets

METHOD FOR RECORDING NON-COMMUNICATION INTERVALS DURING A COMMUNICATIONS CALL

This application is a continuation of application Ser. No. 08/342,199, filed on Nov. 18, 1994, now abandoned.

TECHNICAL FIELD

This invention relates to arrangements for providing different billing for those periods of a call during which no communication takes place (and providing for detection of entering and leaving a "hold" non-communication state).

Problem

During a telephone communication there is often a need to interrupt two way communications and effectively place one of the two parties on hold while some function is carried out during which the two parties cannot communicate. For example, one of the parties may be placed on hold so that the other party can obtain information either through the use of a second line or an alternate leg on an incompletely connected three way conference call or simply while one of the parties is looking for information without using the telephone. Extensive periods of hold can significantly increase the cost of the communication. For example, if a customer is calling an airline company and is placed in an answering queue before the customer can transact business with an agent. While measures such as music on hold may mitigate the annoyance of a customer who is in such a queue and is therefore unable to communicate with the agent, the cost to the customer (if this is a caller paid call) or to the called customer (if this is an 800 call) is considerable. As the price of communications becomes more responsive to the value of the communication, arrangements wherein customers are charged less for a period of hold become an attractive arrangement for obtaining the competitive advantage in the market for telecommunication services, and without changing the tariffed price. Excessive hold times often cause the paying party to hang up to avoid being charged for time wasted (un-productive non-communications).

In many cases the hold is performed using customer premises equipment and the switching systems which record data for charging customers are not even aware that a hold or other noncommunicating interval is occurring unless some energy on the line detectors are employed to determine talk from non-talk. A problem of the prior art, therefore, is that customers are charged for intervals such as hold intervals during which communication does not take place and that there is no good way to detect the presence of such intervals, or to respond to said intervals with special billing treatment.

Solution

The above problem is solved and an advance is made over the prior art in accordance with my invention wherein call billing records are enhanced to include a record of time spent in noncommunicating states such as hold and wherein customers who are charged differently for time in noncommunicating states communicate a transition to such a noncommunicating state through signals to a serving switching system. Advantageously such arrangements make it possible to charge telecommunication customers a lower price for time in a noncommunicating state, by issuing a credit according to some established method for all or a fraction of the time spent in the "non-communicating" state of hold.

In accordance with one aspect of the invention hold signals are communicated to the switch through a combination of flash and dual tone multifrequency signals. Advantageously, such an arrangement allows the switching system to detect a transition to a hold state. Modern switching systems are equipped to detect a flash at any time during a call. Many are already adapted to attach a DTMF receiver to a call when a flash is detected. In alternate arrangements the line can be monitored throughout the call for DTMF signals representing a transition to and from hold. Some hold states are already detected in the switch; for example, when a call waiting call is received and the called customer flashes the switchhook, the switch places the original call on hold. Advantageously, such arrangements provide a connected switching system with the information that is need to record the length of time that is spent in noncommunicating states such as the hold state, a state in which the switch does not complete the call path.

Many options are possible on the amount of reduction of billing for time spent in noncommunicating call states. The most straightforward arrangement is to reduce billing by some fraction (as much as 100%) of the time spent in the noncommunicating states. Alternatively, the amount of time spent in noncommunicating states may be limited for any one call or may be limited to a fraction of the length of a call. Advantageously, such arrangements prevent the lower charge arrangements from being abused.

Music on hold may be treated as either a noncommunicating state (because the caller is unable to communicate with the ultimate called party) or as a communicating state (because the caller does hear something during the music on hold interval).

The credit for time spent in the noncommunicating state may be applied directly to the call or may be credited to future calls or may appear as a lump sum on a monthly bill. The lump sum could then be credited against a future bill, or in some other manner be used to return value to the account of the billed party.

In accordance with one aspect of the invention when call charges are accumulated in a toll switch, the local switches, which usually detect transitions to or from a noncommunicating state, communicate this information to the toll switches. The toll switches thereby can add information concerning the time spent in the noncommunicating state to their call billing records. In accordance with one aspect of the invention the reduced charges may be offered selectively to different callers or different recipients of 800 calls. Advantageously, such an arrangement reduces the resources required to detect transitions from and to noncommunicating states and gives customers greater flexibility in selecting charging options. This may constitute a provisioned service for which a customer must subscribe and pay a fee, to receive the benefits, or can be offered universally by class of service or call type.

DETAILED DESCRIPTION

Figure 1:
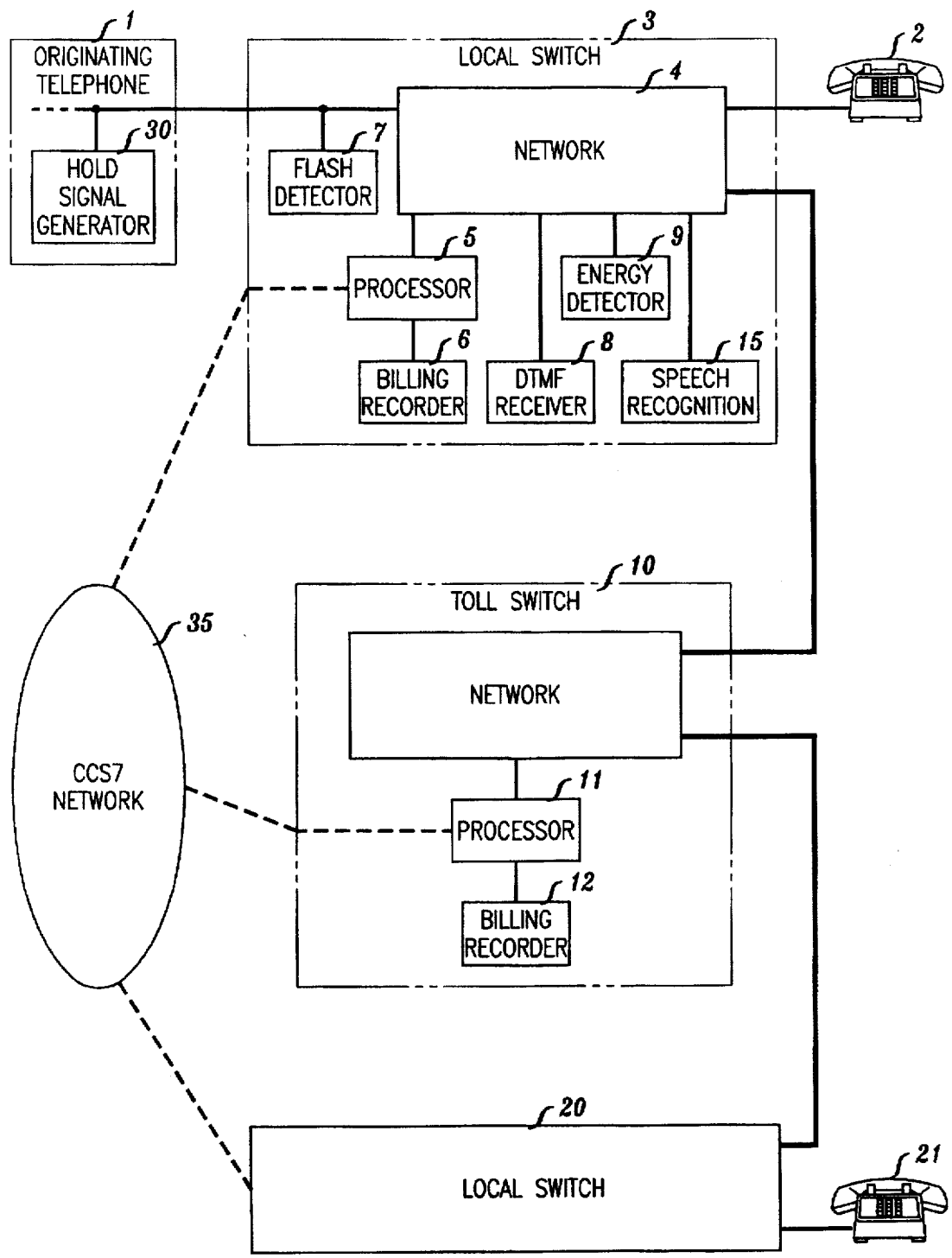
FIG. 1 is a block diagram of a group of telephones and the connected switches.

FIG. 1 shows two telephones 1 and 2 connected to a local switch 3. Telephone station 1 is equipped with a hold signal generator 30 which transmits a dual tone multifrequency (DTMF) signal, e.g., *7, when the caller presses a hold button, and generates a hold release signal, e.g., *8, when the caller releases the hold button. Alternatively or additionally, the switch can be equipped with speech recognition equipment 15 to recognize, for example, the words "pause" and "resume" to start and stop a non-communicating interval. The local switch 3 includes a switching network 3, a processor 5, means for detecting noncommunication states, and billing recorder subsystem 6. The means for detecting a non-communicating state comprise flash detector means 7 connected to a line or line signaling circuit to detect a flash, a plurality of DTMF receivers 8 connected to a line via the network 3; this allows a caller at station 1 to signal a hold by signaling a flash, in response to which a DTMF receiver is attached to a call, and then detect the *7 signal which is interpreted by the processor as a hold signal. Another telephone 21 is connected to local switch 20. Local switches 20 and 3 are interconnected via toll switch 10 which includes a processor 11 and a billing recording subsystem 12.

A flash is a brief interval of on hook which is used as a signal to a switch that further signals are coming. It is also used on call waiting to indicate a request to switch to the other calling party not presently connected to the party generating the flash. Facilities are available in many telephone stations for automatically generating a timed flash and these can be coupled with facilities for automatically transmitting a preselected number so that the operation of a single button such as a hold button can generate both the flash and the following pair of digits which would indicate that the reason for the flash is a transition to or from hold; block 30 is composed of these facilities. The hold for call waiting is detected directly at the local switching system (local switch) as a request to change the call state, a function which is performed in the local switch.

The billing recording subsystem 6 is used to record details of a call such as the calling and called telephone number, time and duration of the call so that charges for the call can be calculated from this data. In accordance with the principles of this invention, the call billing record is enhanced to include data concerning noncommunicating time. This data is subsequently processed to subtract some fraction of the noncommunicating time from the total duration of the call.

Figure 2:
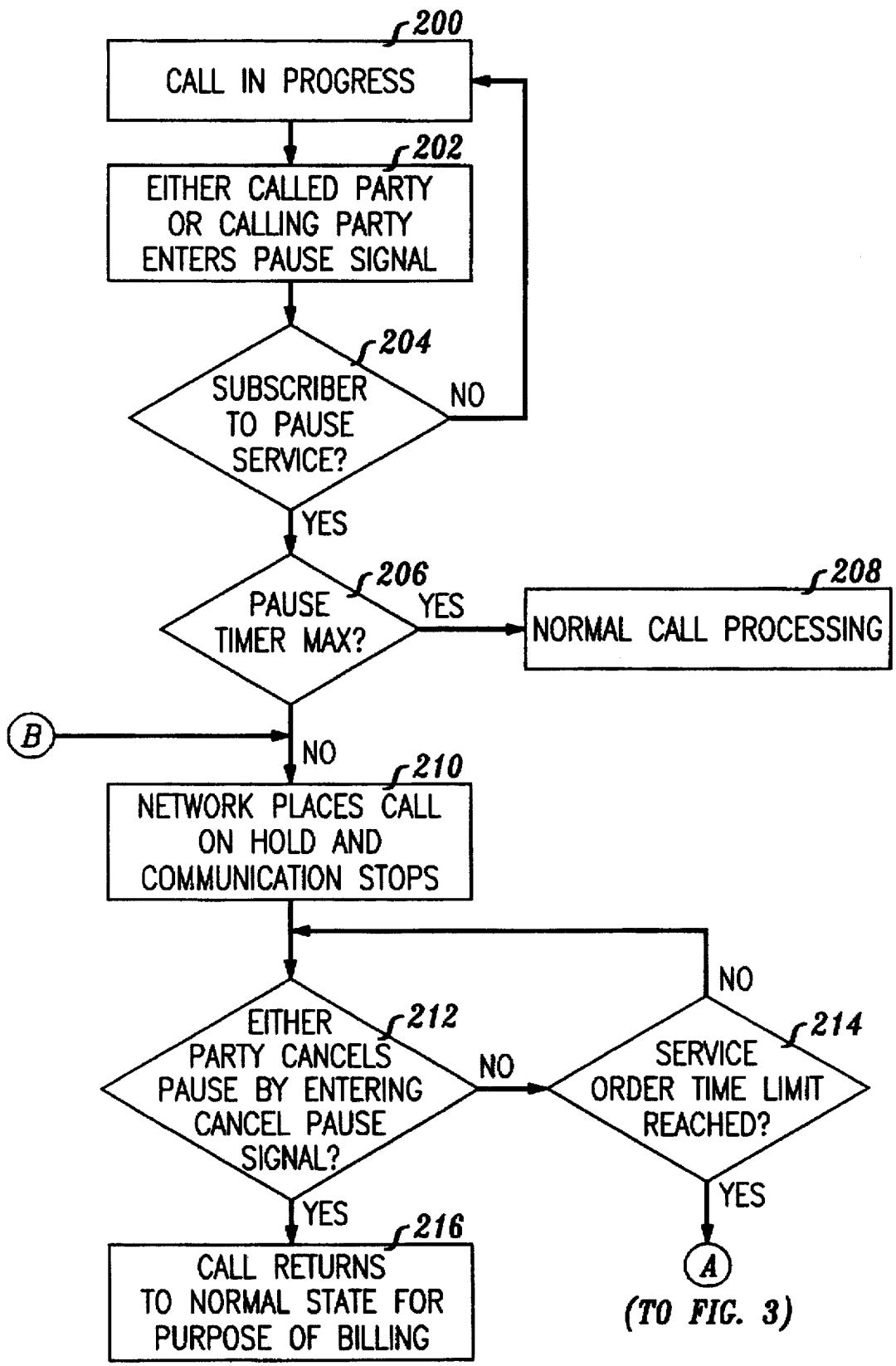
FIGS. 2–4 are call flow diagrams illustrating the operation of applicant's invention.
Figure 3:
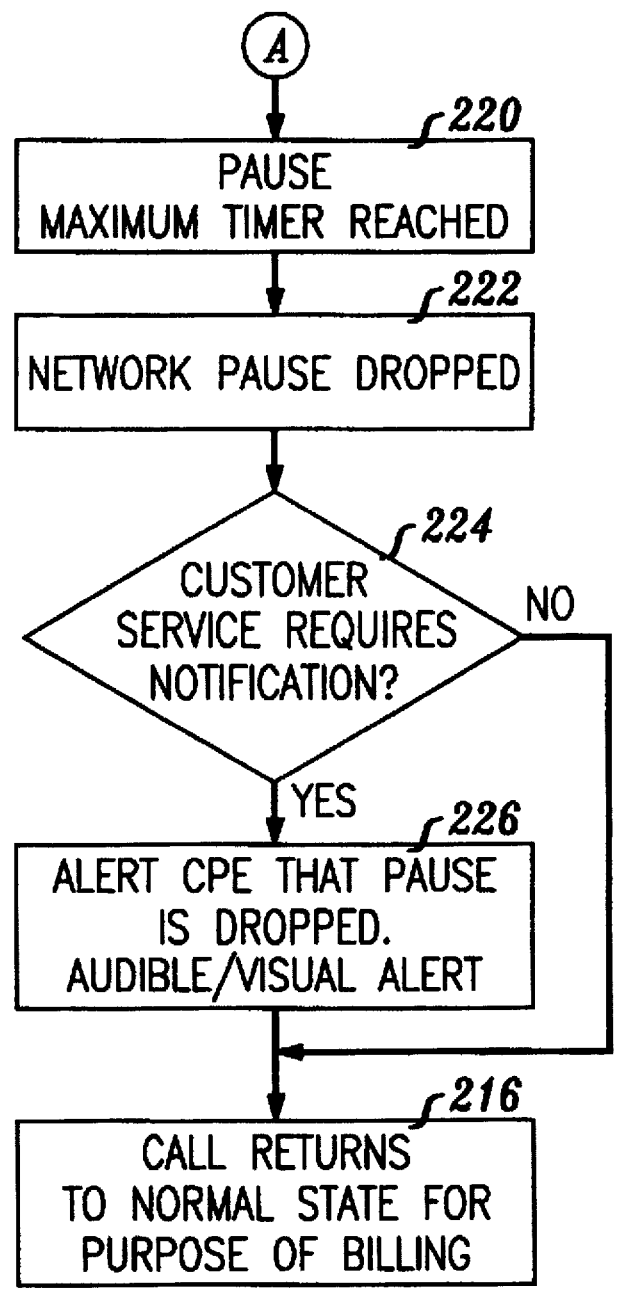
Figure 4:
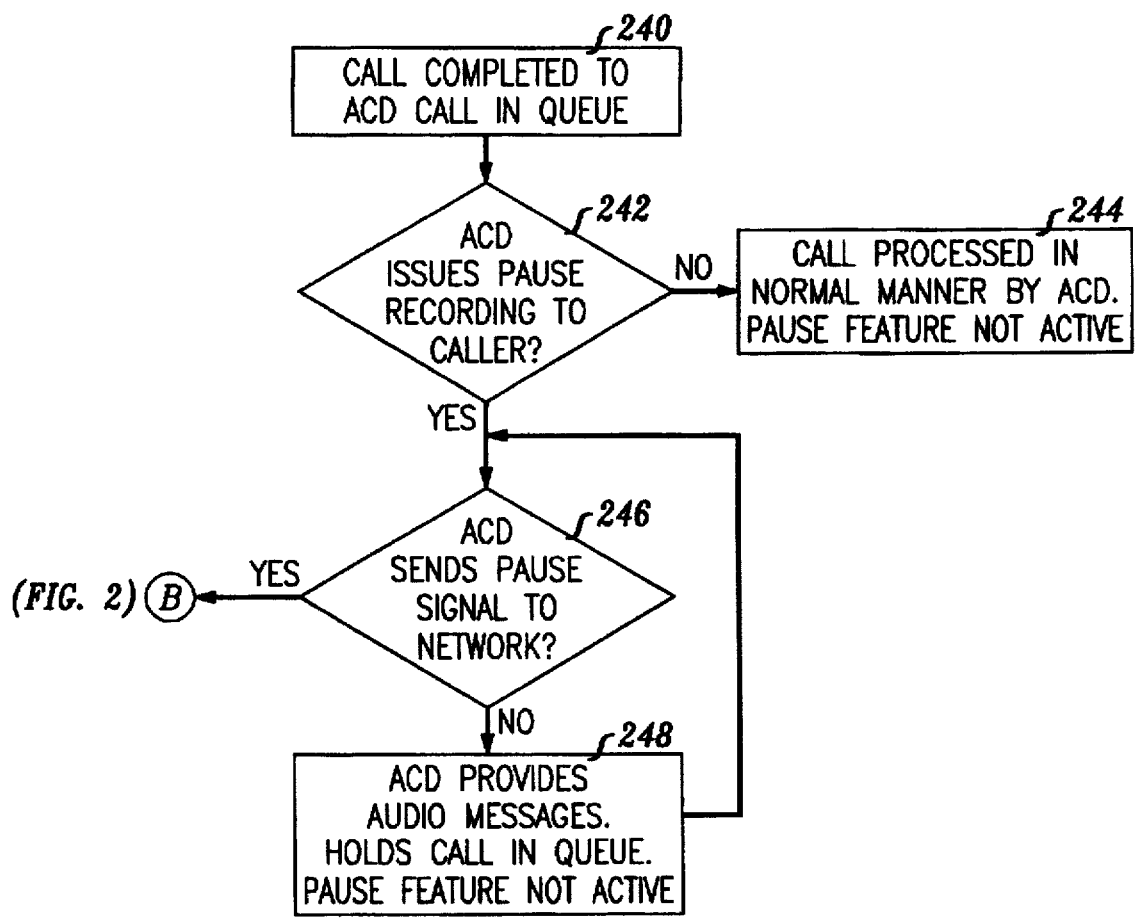

The toll switch 10 has its own processor and billing subsystem for billing for toll calls. A pause is detected in the toll switch responsive to data messages received over the CCS7 network 35 such as messages from an automatic call distributor indicating that a call has been placed in a queue and indicating when the call is actually being served. In addition, the toll switch is notified of hold operations detected in the local switches by common channel signaling messages from these local switches. Thus, for toll calls in which billing recording is performed in the toll switch, the toll switch is able to build up the same record of noncommunicating time that can be built up for local calls in the local switch. FIG. 2 illustrates the operation of applicant's invention. Initially a call is in progress (action block 200). The calling or called party enters a pause signal in the preferred embodiment of the invention, the pause signal is a flash followed by a two digit DTMF message such as 7 or a feature defined key from an Analog Display Services Interface (ADSI) or Smartphone type of customer premises equipment or from an Integrated Services Digital Network (ISDN) station. Test 204 then checks whether the customer subscribes to the pause service. If not, action block 200 is reentered. If so, test 206 is entered. Test 206 determines whether the maximum amount of time that may be accumulated for pause intervals has already been accumulated. This maximum is a parameter stored in each office and selected by the carrier which owns that office; in some cases the maximum may be essentially infinite if the carrier so choses. If the maximum has been reached then normal call processing is resumed (action block 208). If the maximum has not yet been reached then the network places the call on hold and communication stops. During this time the pause timer is incremented. Test 212 checks to see if either party cancels the pause by entering a cancel pause signal (in the preferred embodiment flash 78). If no cancel pause signal is entered then test 214 checks to see if the service order time limit has been reached. If the limit has not been reached test 212 is retied. If the limit has been reached then block 220 to be discussed here and after is entered. If either party enters the cancel pause signal to the normal billing state and incrementing the time of the call is resumed. The credit for non-communicating time can be performed by the billing system using the recorded billing data concerning both total elapsed time of calls and non-communicating time. This is more flexible than having the processor decide directly how to modify the billing record to take into account the non-communicating time.

If the pause timer maximum has been reached (action block 220) then the network pause feature is dropped (action block 222). Test 224 determines whether the customer should be notified of the cancellation of the network pause feature for this call. If not, the call returns to the normal state for purpose of billing (action block 216). If the customer must be notified that the pause feature has been dropped for this call then action block 226 is entered to alert the customer premise equipment that the pause feature is dropped. The alert can be audible (a tone) or a visual (a display or a lamp).

If the call is completed to an automatic call distributor (ACD) and the call is placed initially in a queue action block 240 is entered. Test 242 checks whether the ACD issues a pause recording to the caller. This can be done, for example, by a DTMF signal or a data message from the ACD. If not then the call is processed in the normal manner by the ACD and the pause feature is not active (action block 244). If the ACD does issue a pause command, a cheek is made whether the ACD has sent the pause signal to the network. If not the ACD simply provides the normal audio messages possibly including music on hold and holds the call in its queue (action block 248). If the ACD does send the pause signal then action block 210 previously described is entered.

The call placed on the ACD queue, and in the "hold" state, will be returned to the communication "non-hold" state when the ACD routes the call to its destination. The ACD would issue the appropriate cancel "hold" data command.

While the hold state is the primary non-communicating state, a speech energy detector 9 can be used to detect long periods of silence which can also be treated as a non-communicating state.

If a called customer station 21 at switch 20 places a call on hold, the hold signal can be detected in the same way as it can be detected in switch 3. A CCS7 message from switch 20 to switch 3 informs switch 3 of the hold state; switch 3 can then make a billing entry in billing recorder 6 to treat the called party hold period as a period of non-communicating state. Such a state would also be detected by the speech energy detector 9.

It is to be understood that the above description is only of one preferred embodiment of the invention. Numerous other arrangements may be devised by one skilled in the an without departing from the scope of the invention. The invention is thus limited only as defined in the accompanying claims.

I claim:

1. In a telecommunications switching system which serves at least one calling telephone station, a method for adjusting charges for intervals non-communication between a caller and a called party during a call, comprising the steps of:

detecting in the switching system a signal from the calling station indicating a forthcoming interval of non-communication between a caller and a called party during said call;

making a record of elapsed time of said interval non-communication; and adjusting charges for said call based on said elapsed time of said interval of non-communication in said record.

2. The method of claim 1 further comprising providing notification when a predetermined time limit for adjusting charges has been reached.

3. The method of claim 1 wherein said signal for said non-communication interval comprises a dual tone multi-frequency (DTMF) signal.

4. The method of claim 1 wherein said signal for said non-communication comprises detecting a flash.

5. The method of claim 1 further comprising the step of detecting intervals of non-communication by detecting intervals of absence of speech energy on a call.

6. The method of claim 5 wherein said detecting intervals of absence of speech energy comprises detecting absence of speech energy for a predetermined minimum interval.

7. The method of claim 1 wherein the step of making a record of elapsed time comprises accumulating elapsed time for said intervals.

8. The method of claim 7 wherein the step of accumulating time for said intervals comprises accumulating time for each interval.

9. The method of claim 7 wherein the step of accumulating time comprises the step of accumulating total time for said intervals.

10. The method of claim 1 further comprises the step of detecting in the switching system a signal from a called end of a call indicating a forthcoming interval of non-communication between a caller and a called party.

11. The method of claim 1 wherein the step of detecting a signal from said calling station indicating a forthcoming interval of non-communication comprises receiving common channel signaling signals indicating a hold state on a call.

12. The method of claim 1 wherein the steps are performed in a toll switch and further comprising the step of receiving a common channel signal from a local switch said common channel signal indicating that an interval of non-communication for said call has been detected in a local switch of said call.

13. The method of claim 1 wherein using the record of elapsed time of said interval of non-communication for adjusting charges comprises the step of adjusting equivalent time in a billing recording process.

14. The method of claim 1 wherein using the record of elapsed a time of said interval of non-communication for adjusting charges comprises the step of limiting adjustment to a predetermined percentage of the length of a call.

15. The method of claim 1 wherein using the record of elapsed time of said interval of non-communication for adjusting charges comprises the step of limiting adjustment of charges to the charge for an established upper limit of elapsed time.

16. The method of claim 1 wherein using the record of elapsed time of said interval of non-communication for adjusting charges comprises the step of crediting charges for a future interval.

17. In a telecommunications switching system serving at least one calling telephone, a method for adjusting charges for an interval of non-communication between a caller and a called party during a call comprising the steps of:

detecting in the switching system an interval of non-communication between a caller and called party during the call;

making a record of elapsed time of the interval of non-communication;

using the record of elapsed time of the interval of non-communication for adjusting charges for the call wherein the adjustment of charges is subject to an adjustment limit; and providing notification that the adjustment limit has been reached.

18. The method of claim 17 wherein the step of adjusting charges comprises the step of adjusting equivalent time in a billing recording process.

19. The method of claim 17 wherein the step of adjusting charges comprises the step of limiting adjustment to a predetermined percentage of the length of a call.

20. The method of claim 17 wherein the step of adjusting charges comprises the step of limiting adjustment of charges for an established upper limit of elapsed time.

* * * * *

UNITED STATES PATENT AND TRADEMARK OFFICE
CERTIFICATE OF CORRECTION

PATENT NO. : 5,710,807
DATED : January 20, 1998
INVENTOR(S) : David B. Smith It is certified that error appears in the above-identified patent and that said Letters Patent is hereby corrected as shown below:

Column 5, claim 1, line 1, after "intervals" insert --of--.

Column 5, claim 1, line 8, after "interval" insert --of--.

Column 5, claim 4, line 19, after "non-communication" insert --interval--.

Signed and Sealed this

Fifteenth Day of September, 1998

*Attest:*

BRUCE LEHMAN

*Attesting Officer*  *Commissioner of Patents and Trademarks*